United States Patent
Kuroki

(10) Patent No.: US 7,907,153 B2
(45) Date of Patent: Mar. 15, 2011

(54) CONTENT PROVIDING METHOD, A PROGRAM OF CONTENT PROVIDING METHOD, A RECORDING MEDIUM ON WHICH A PROGRAM OF A CONTENT PROVIDING METHOD IS RECORDED, AND A CONTENT PROVIDING APPARATUS

(75) Inventor: Yoshihiko Kuroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 687 days.

(21) Appl. No.: 11/782,473

(22) Filed: Jul. 24, 2007

(65) Prior Publication Data

US 2008/0079754 A1    Apr. 3, 2008

(30) Foreign Application Priority Data

Jul. 27, 2006   (JP) .................. P2006-204124

(51) Int. Cl.
*G09G 5/00* (2006.01)

(52) U.S. Cl. ........................ 345/660; 345/204

(58) Field of Classification Search .......... 345/660, 345/663, 670, 671, 204; 348/239, 240.99, 348/561, 578, 581, 99; 386/112, 120; 382/233, 382/276, 298; 396/60

See application file for complete search history.

(56) References Cited

U.S. PATENT DOCUMENTS

2006/0087520 A1*   4/2006   Ito et al. ............... 345/660

FOREIGN PATENT DOCUMENTS

| JP | 07-288806 | 10/1995 |
| JP | 09-098417 | 4/1997 |
| JP | 2005-034345 | 2/2005 |
| JP | 2005-142654 | 6/2005 |
| JP | 2005-215351 | 6/2005 |
| JP | 2005-341345 | 12/2005 |

OTHER PUBLICATIONS

Office Action issued by Japanese Patent Office on Jul. 6, 2010, in Japanese patent application No. 2006-204124.

\* cited by examiner

*Primary Examiner* — Abbas I Abdulselam
(74) *Attorney, Agent, or Firm* — Finnegan, Henderson, Farabow, Garrett & Dunner, L.L.P.

(57) ABSTRACT

A content providing method, a program of a content providing method, a recording medium on which a program of a content providing method is recorded, and a content providing apparatus are provided. The content providing method includes the steps of: outputting moving image data of video contents; selecting moving image data in a partial area from the moving image data of the video contents, and outputting zoomed-in moving image data; thinning out frames and pixels of the moving image data of the video contents except at least the partial area, and outputting moving image data slightly zoomed out; and outputting the zoomed-in moving image data and the moving image data slightly zoomed out.

8 Claims, 8 Drawing Sheets

CONTENT PROVIDING METHOD, A PROGRAM OF CONTENT PROVIDING METHOD, A RECORDING MEDIUM ON WHICH A PROGRAM OF A CONTENT PROVIDING METHOD IS RECORDED, AND A CONTENT PROVIDING APPARATUS

CROSS REFERENCES TO RELATED APPLICATIONS

The present invention contains subject matter related to Japanese Patent Application JP 2006-204124 filed in the Japanese Patent Office on Jul. 27, 2006, the entire contents of which being incorporated herein by reference.

BACKGROUND OF THE INVENTION

1. Field of the Invention

The present invention relates to a content providing method, a program of a content providing method, a recording medium on which a program of a content providing method is recorded, and a content providing apparatus, which for example can be adapted to provide video contents such as a sport program for a user. The invention is to provide video in which moving image data of high resolution at a high frame rate is partially cut out to form zoomed-in moving image data, the resolution and the frame of the remaining portion are thinned out to generate the moving image data slightly zoomed out, and the zoomed-in moving image data and the moving image data slightly zoomed out are sent, whereby the prevention of jerkiness and a moving image to be out of focus is achieved while an increase in data volume to send is being avoided, and the video slightly zoomed out and zoomed-in video can be selectively provided for a user.

2. Description of the Related Art

Heretofore, in moving image data according to video signals of NTSC (National Television System Committee) and HDTV (High Definition Television), the field frequency is defined to 60 Hz or 59.94 Hz, and in moving image data according to video signals in the PAL (Phase Alternation by Line) mode, the field frequency is defined to 50 Hz. Generally, in the motion picture, the frame frequency is defined to 24 Hz.

In the representation of moving image data according to the field frequency and the frame frequency, image quality deterioration such as out-of-focus moving images and jerkiness is known. Here, the out-of-focus moving image occurs in an imaging system and a display system. The out-of-focus moving image taken place in the imaging system occurs by intermittently shooting a moving subject for a charge storage time period in a certain length. In addition, the out-of-focus moving image taken place in the display system occurs in a so-called hold type display device. Moreover, here, for example, the hold type display device is a device that continuously displays an image in each frame for a single frame period like a liquid crystal display the panel. The out-of-focus moving image taken place in the display system also occurs in a motion picture by projecting a film, and a motion picture by DLP (Digital Light Processing). The out-of-focus moving image taken place in the display system is perceived by the occurrence of a shift of an image on the retina called the retinal slip when a moving object displayed is followed and viewed (SHIKAKU JOUHO SYORI HANDOBUKKU, Asakura Publishing Co., Ltd., p. 393).

Therefore, the out-of-focus moving image taken place in the imaging system can be prevented by shortening the charge storage time period, and the out-of-focus moving image taken place in the display system can be prevented by using a display device on the impulse response side with a short emission time.

However, when the charge storage time period is simply shortened to use the display device on the impulse response side with a short emission time in the conventional field frequency and frame frequency, jerkiness is perceived. Here, jerkiness is a phenomenon that the motion of the subject can be seen discretely when the moving subject is shot. Therefore, in order to prevent the out-of-focus moving image and further prevent jerkiness, it can be thought that it is necessary to increase the frame frequency.

As to a display for moving image data, JP-A-2005-215351 (Patent Reference 1) discloses a configuration in which data is partially cut out to display zoomed-in data.

In relay broadcasting of sports, such as soccer and American football, shooting is shared by a plurality of television cameras, and moving image data obtained by the plurality of the television cameras is keyed for broadcasting. More specifically, in the relay broadcasting, for example, a single television camera shoots the full view of the pitch and the field or a part of the pitch and the field as it slightly zooms out, and the other television cameras zoom in and follow a ball or a particular player. Moreover, in the case in which right after a game is started and then the game is suspended, it is difficult to follow a subject by zoomed-in video, and the video taken by a television camera that slightly zooms out is broadcast.

As to video contents like this, suppose both of video slightly zoomed out and zoomed-in video are provided for a user, two types of video can be selectively displayed or two types of video can be displayed at the same time on the user side, and it can be thought that ways to enjoy video contents are increased.

However, in the case in which both of video slightly zoomed out and zoomed-in video are simply sent, two systems of moving image data have to be sent, causing a problem that it is necessary to send data volume twice as much as that of a single system of moving image data.

For one of schemes to solve this problem, for example, a method can be thought in which the scheme described in JP-A-2005-215351 is adapted to cut out zoomed-in video of video slightly zoomed out and the video is offered. According to this scheme, it is enough to send a single system of moving image data. Thus, the data volume to send can be decreased more than the case in which two systems of moving image data of video slightly zoomed out and zoomed-in video are simply sent.

However, even though this is done, when it is intended to prevent out-of-focus moving images and jerkiness described above, it is necessary to send a single system of moving image data that displays video slightly zoomed out at a high frame rate, causing a problem that the data volume to send is increased.

SUMMARY OF THE INVENTION

Thus, it is desirable to provide a content providing method, which can prevent an out-of-focus moving image and jerkiness while an increase in the data volume to send is being avoided, and can selectively provide video slightly zoomed out and zoomed-in video to a user, a program of a content providing method, a recording medium on which a program of a content providing method is recorded, and a content providing apparatus.

An embodiment of the invention is directed to a content providing method including the steps of: outputting moving image data of video contents; selecting moving image data in a partial area from the moving image data of the video contents, and outputting zoomed-in moving image data; thinning out frames and pixels of the moving image data of the video contents except at least the partial area, and outputting moving image data slightly zoomed out; and outputting the zoomed-in moving image data and the moving image data slightly zoomed out.

An embodiment of the invention is directed to a program of a content providing method including the steps of: outputting moving image data of video contents; selecting moving image data in a partial area from the moving image data of the video contents, and outputting zoomed-in moving image data; thinning out frames and pixels of the moving image data of the video contents except at least the partial area, and outputting moving image data slightly zoomed out; and outputting the zoomed-in moving image data and the moving image data slightly zoomed out.

An embodiment of the invention is directed to a recording medium on which a program of a content providing method of providing video contents is recorded, the program of the content providing method including the steps of: outputting moving image data of video contents; selecting moving image data in a partial area from the moving image data of the video contents, and outputting zoomed-in moving image data; thinning out frames and pixels of the moving image data of the video contents except at least the partial area, and outputting moving image data slightly zoomed out; and outputting the zoomed-in moving image data and the moving image data slightly zoomed out.

An embodiment of the invention is directed to a content providing apparatus including: a moving image data output part configured to output moving image data of video contents; a moving image data selecting part configured to select moving image data in a partial area from the moving image data of the video contents, and to output zoomed-in moving image data; a thinning part configured to thin out frames and pixels of the moving image data of the video contents except at least the partial area, and to output moving image data slightly zoomed out; and a data output part configured to output the zoomed-in moving image data and the moving image data slightly zoomed out.

An embodiment of the invention is directed to a content providing apparatus which is connected to a network, and is configured to display moving image data outputted from a host unit, wherein the host unit includes: a moving image data output part configured to output moving image data of video contents; a moving image data selecting part configured to select moving image data in a partial area from the moving image data of the video contents, and to output zoomed-in moving image data; a thinning part configured to thin out frames and pixels of the moving image data of the video contents except at least the partial area, and to output moving image data slightly zoomed out; and a data output part configured to output the zoomed-in moving image data and the moving image data slightly zoomed out to the network, and the content providing apparatus includes: an input part configured to input the zoomed-in moving image data and the moving image data slightly zoomed out from the network; and a display part configured to selectively display the zoomed-in moving image data, the moving image data slightly zoomed out inputted in the input part.

According to the configurations above, the zoomed-in moving image data and the moving image data slightly zoomed out are outputted, and then the zoomed-in moving image data and the moving image data slightly zoomed out are used to provide the zoomed-in video and the video slightly zoomed out to a user. In addition, the moving image data in the partial area selected from the moving image data of the video contents is the zoomed-in moving image data, and the moving image data slightly zoomed out is generated from the moving image data of the video contents except at least the partial area. Therefore, the data volume to send can be decreased more than the case in which two systems of moving image data, video slightly zoomed out and zoomed-in video, are simply sent. In addition, the moving image data slightly zoomed out for the video slightly zoomed out is generated by thinning out frames and pixels. Therefore, the data volume to send can be decreased more than the case in which the moving image data of the video contents is directly sent and the zoomed-in video and the video slightly zoomed out are generated on the receiving side to prevent out-of-focus motion and jerkiness, and out-of-focus moving images and jerkiness can be prevented.

According to the embodiments of the invention, out-of-focus moving images and jerkiness can be prevented while an increase in the data volume to send is being avoided, and the video slightly zoomed out and zoomed-in video can be selectively provided to a user.

DETAILED DESCRIPTION OF THE INVENTION

Hereinafter, embodiments of the invention will be described in detail with reference to the drawings.

Embodiment 1

1. The Configuration of the Embodiment

Figure 1:
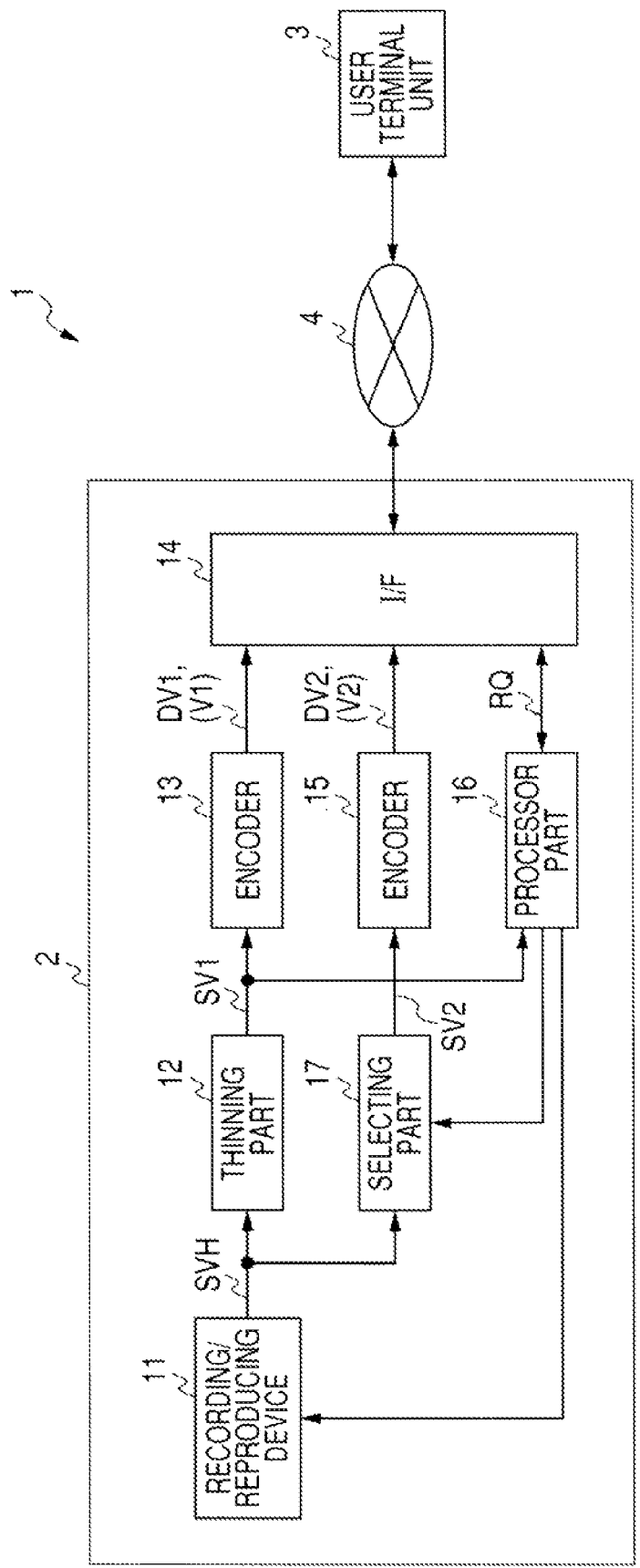
FIG. 1 shows a block diagram depicting a video content providing system according to Embodiment 1 of an embodiment of the invention.
Figure 2A:
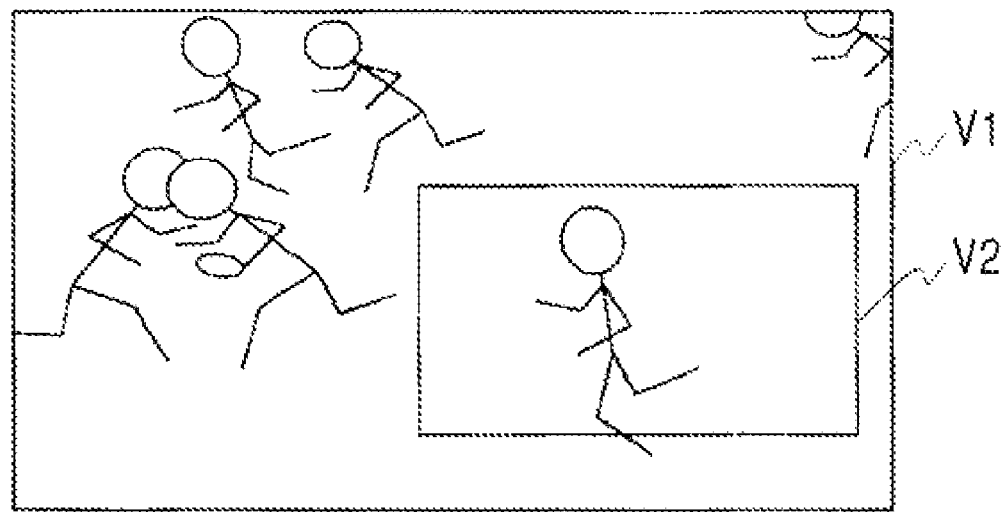
FIGS. 2A and 2B show a plan view illustrative of zoomed-in video by the video content providing system shown in FIG. 1.

FIG. 1 shows a block diagram depicting a video content providing system according to Embodiment 1 of the invention. In this video content providing system 1, a host unit 2 is connected to a user terminal unit 3 via a home network 4. As shown in FIG. 2A, video contents are provided from the host unit 2 to the user terminal unit 3 so that video slightly zoomed out V1 and the zoomed-in video V2 that is partially cut out of the video slightly zoomed out V1 can be selectively displayed, and the video contents are provided from the user terminal unit 3 for a user. From a user, the video content providing system 1 accepts specifying the area to generate the zoomed-in video V2 from the video slightly zoomed out V1 in the user terminal unit 3.

Here, for example, in the host unit 2, a recording/reproducing device 11 is a large capacity hard disk device or an optical disk player, which outputs moving image data SVH that is video contents under control done by a processor part 16. Here, the moving image data SVH is formed of video signals of high resolution at a high frame rate. The moving image data SVH is moving image data of a high frame rate that can prevent out-of-focus moving images and jerkiness even though the area of video data is partially cut out to display the zoomed-in video V2 on the full screen in the user terminal unit 3. Suppose the frame frequency is 50 frames per sec or greater, out-of-focus moving images and jerkiness can be deceased in moving image data, and suppose the frame frequency is 120 frames per sec or greater, out-of-focus moving images and jerkiness can be made difficult to perceive. In this embodiment, the recording/reproducing device 11 outputs moving image data SVH at a frame frequency of 120 frames per sec.

In addition, the moving image data SVH is high resolution moving image data that can display the zoomed-in video V2 on the full screen in sufficient resolution even though the area of video data is partially cut out to display the zoomed-in video V2 on the full screen in the user terminal unit 3. Preferably, it is desired that the resolution of the moving image data SVH is that of VGA (Video Graphics Array) or greater, and more preferably, it is desired that the resolution is that of HDTV (High Definition Television) or greater.

A thinning part 12 thins out the pixels and frames of the moving image data SVH, and outputs moving image data SV1. Here, in the video content providing system 1, since the area of video data is partially cut out from the moving image data SVH to generate the zoomed-in video V2, in the case in which the moving image data SVH is displayed on the full screen in the user terminal unit 3 (V1), the motion of the subject naturally becomes smaller and the allowance for out-of-focus moving images and jerkiness becomes greater than the case in which the partial area is displayed on the full screen in the user terminal unit 3. In addition, as to the resolution, in the case in which the moving image data SVH is displayed on the full screen in the user terminal unit 3, the allowance becomes greater than the case in which the partial area is displayed on the full screen in the user terminal unit 3. The thinning part 12 thins out the frame of the moving image data SVH by the allowance that is greater with respect to out-of-focus moving images and jerkiness. In addition, it thins out the pixel of the moving image data SVH by the allowance that is greater with respect to the deterioration of resolution. Moreover, the thinning out of the pixels and the frames can be set to various thinning rates when sufficient characteristics can be secured in practice.

An encoder 13 compresses the moving image data SV1 outputted from the thinning part 12, and generates encoded data DV1. In addition, for the data compression, schemes such as MPEG (Moving Picture Experts Group)-4 can be adapted. The host unit 2 provides the encoded data DV1 to the user terminal unit 3 as the video slightly zoomed out V1.

An interface (I/F) 14 sends the encoded data DV1 outputted from the encoder 13 to the home network 4 together with encoded data DV2 outputted from an encoder 15. In addition, the interface receives various requests RQ from the user terminal unit 3 via the home network 4, and notifies the received request RQ to a processor part 16, for example. Here, in this embodiment, the request RQ from the user terminal unit 3 is to specify the area for cutout of the zoomed-in video V2 from the video slightly zoomed out V1.

A selecting part 17 selects the moving image data in a certain area from the moving image data SVH in accordance with the instruction from the processor part 16, and outputs the zoomed-in moving image data SV2 that shows the zoomed-in video V2.

As similar to the encoder 13, the encoder 15 compresses the zoomed-in moving image data SV2, and outputs the resulting encoded data DV2.

The processor part 16 is a processor unit that, executes a program recorded on a recording unit, not shown, and controls the operation of the host unit 2. In addition, in the embodiment, although the program is installed in the user terminal unit 3 in advance and offered, instead of this, the program may be offered by recording it on a recording medium such as an optical disk, a magnetic disk, and a memory card, and the program may be offered by downloading it via a network such as the Internet. In addition, the thinning part 12, the encoders 13 and 15, and the selecting part 17 maybe configured as a functional block of the processor part 16.

In other words, when the processor part 16 is requested by the user terminal unit 3 for notification, of reproducible video contents, it notifies the titles of the video contents recorded in the recording/reproducing device 11 to the user terminal unit 3. In addition, when the user terminal unit 3 instructs reproducing the video contents by this notification, the processor part 16 controls the operation of the recording/reproducing device 11 so as to reproduce the video contents instructed by the user terminal unit 3. In addition, the processor part 16 in turn processes the moving image data SVH of the video contents outputted from the recording/reproducing device 11 in the thinning part 12 and the encoder 13, and provides it to the user terminal unit 3. Thus, the processor part 16 provides the video slightly zoomed out V1 to the user terminal unit 3.

Figure 3:
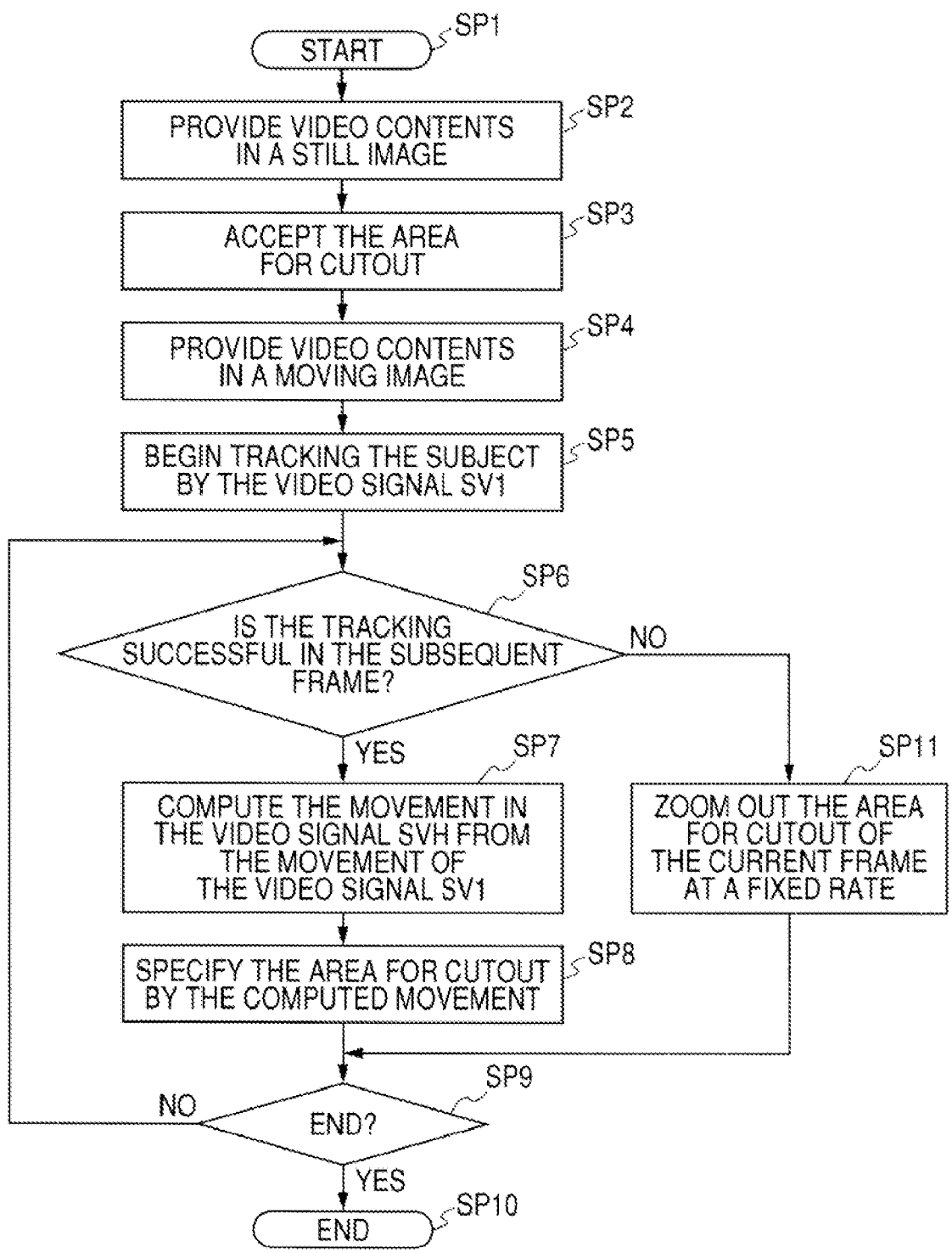
FIG. 3 shows a flow chart depicting the process steps of a processor part of the video content providing system shown in FIG. 1.

AS described above, when a request for the zoomed-in video V2 is obtained from the user terminal unit 3 in the state in which the video slightly zoomed out V1 is provided to the user terminal unit 3, the processor part 16 starts process steps shown in FIG. 3. In other words, when the processor part 16 starts the process steps, the process goes from Step SP1 to Step SP2. Here, the processor part 16 suspends the reproduction of the video contents in the recording/reproducing device 11, and sets the operation of the thinning part 12 so that the moving image data of the frame currently being outputted is repeatedly outputted. Thus, the processor part 16 switches the video contents currently being provided to a still image. In addition, the output of the video contents in the still image may be controlled by the recording/reproducing device 11.

In this state, the processor part 16 accepts the setting of the partial area to generate the zoomed-in video V2 from the user terminal unit 3. In addition, here, for example, the acceptance of the setting is executed by accepting the input of the center coordinates of the partial area in the still image currently provided to the user terminal unit 3. In addition, the acceptance of the partial area is eventually to specify a subject to be displayed in the zoomed-in video V2. Therefore, instead of the center coordinates of the partial area, the setting of the partial area may be accepted by the coordinates of subject to be displayed in the zoomed-in video V2. In addition, for example, the setting of the partial area may be accepted by specifying the end point in the diagonal direction. The processor part 16 analyses the moving image data SV1 outputted from the thinning part 12, and detects a target subject for tracking in the partial area.

Subsequently, the processor part 16 goes to Step SP4, instructs the recording/reproducing device 11 to restart reproducing the video contents, and restarts providing the video contents in moving images. In addition, in the subsequent Step SP5, it analyzes the moving image data SV1 outputted from the thinning circuit 12, and starts tracking the subject detected in Step SP3. In addition, here, for example, for the detection and tracking of the subject, various schemes may be adapted such as the detection and tracking of the subject using template matching, and the detection and tracking of the subject using characteristic points. Moreover, the processor part 16 instructs the selecting part 17 and the encoder 15 to start the operations, and instructs starting the output of the zoomed-in video V2.

Subsequently, the processor part 16 goes to Step SP6, and here, it determines whether the subject is successfully tracked in the subsequent frame. Here, when it is successful, the processor part 16 goes from Step SP6 to Step SP7. Here, from the movement of the target subject for tracking that is detected in the moving image data SV1 and specified by the user from the current frame to the subsequent frame, the movement between the successive frames of the subject in the moving image data SVH before thinned out is computed. In addition, in this embodiment, the movement of the subject from the current frame to the subsequent frame detected in the moving image data SV1 is divided at the ratio of the frame frequency between the moving image data SV1 and the moving image data SVH to compute the movement in the moving image data SVH.

Figure 2B:
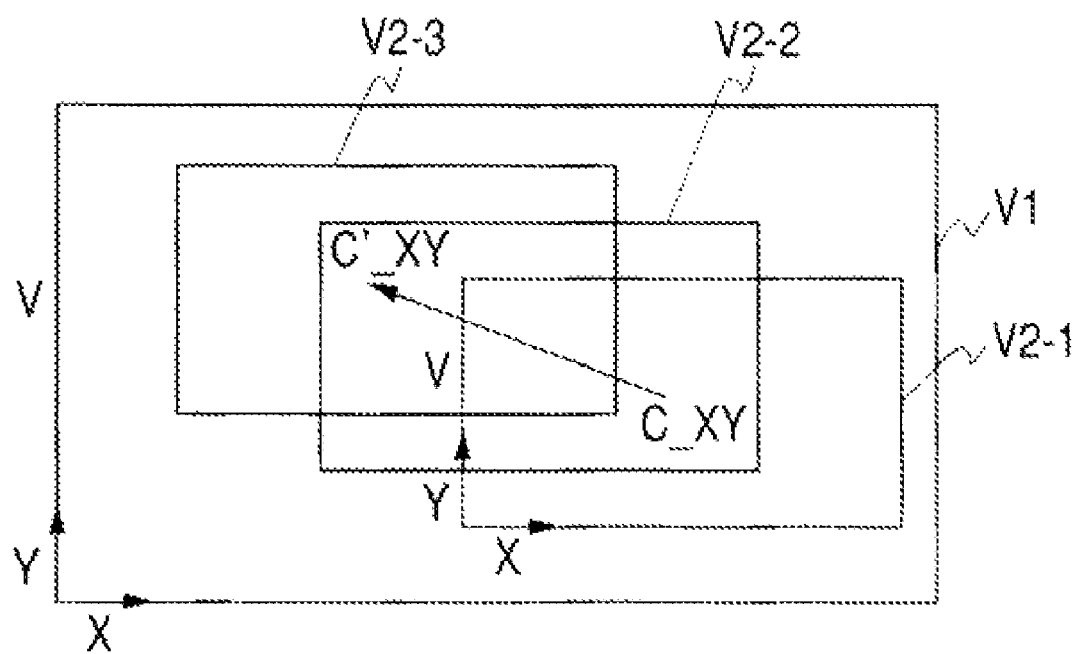

Subsequently, the processor part 16 goes to Step SP8. Based on the movement computed in Step SP8, it computes the coordinates of the partial area to be cut out of the moving image data SVH so that the partial area is moved as it follows the motion of the target subject for tracking for every frame of the moving image data SVH in the period from the current frame to the subsequent frame of the moving image data SV1, and in turn notifies the coordinates of each of the computed frames to the selecting part 17. Thus, as depicted by signs V2-1 to V2-3 shown in FIG. 2B, the host unit 2 varies the partial area to generate zoomed-in video so as to track the movement of the subject, and generates the moving image data SV2 from the zoomed-in video V2.

In addition, in the process in Step SP8, the processor part 16 restricts the movable range of the partial area to generate the zoomed-in video V2 within a fixed range, and assures that the partial area is not off the picture frame of the moving image data SVH.

After the processor part 16 finishes the process in Step SP8, it goes to Step SP9. It determines whether the user terminal unit 3 instructs finishing the provision of the zoomed-in video V2. Here, when the instruction is not made, the process goes from Step SP9 to Step SP6. On the other hand, when the instruction is made in Step SP9, the process goes from Step SP9 to Step SP10 to end the process steps.

In contrast to this, when the tracking is unsuccessful in Step SP6, the processor part 16 goes from Step SP6 to Step SP11. It in turn scales up the partial area without varying the center position of the partial area set in the current frame, whereby it zooms out the zoomed-in video V2, and goes to Step SP9. In addition, in this case, the selecting part 12 assures that the resolution of the moving image data SV2 is not changed even though the partial area is scaled up by interpolation processing.

Figure 4:
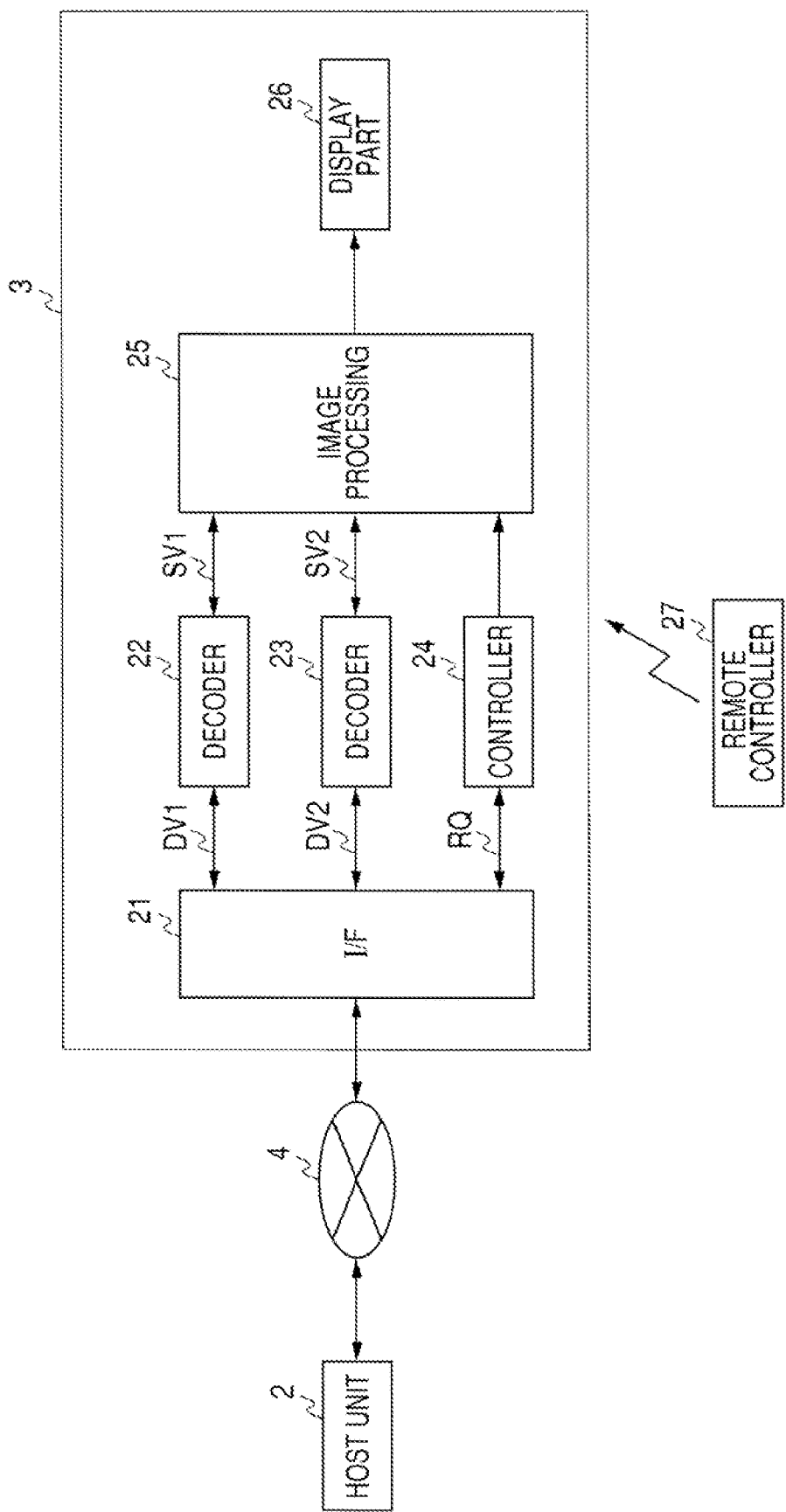
FIG. 4 shows a block diagram depicting the details of a user terminal unit the video content providing system according to Embodiment 1 of an embodiment of the invention.

FIG. 4 shows a block diagram depicting the details of the configuration of the user terminal unit 3. In the user terminal unit 3, an interface (I/F) 21 outputs encoded data DV1 and DV2 inputted via the home network 4 to decoders 22 and 23, and notifies various requests RQ outputted from a controller 21 to the host unit 2.

The decoders 22 and 23 decode the encoded data DV1 and DV2, respectively, and output moving image data SV1 and SV2.

A display part 26 is formed of a liquid crystal display device, for example, and displays video of moving image data outputted from an image processing part 25.

Figure 5C:
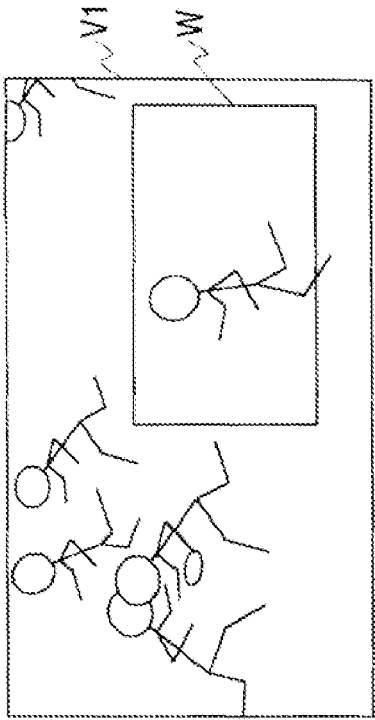
FIGS. 5A to 5D show a plan view depicting the display screen of a user terminal unit shown in FIG. 4.
Figure 5D:
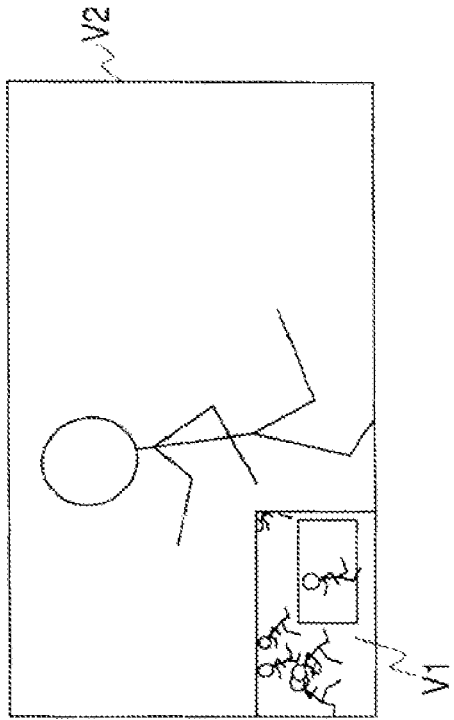
Figure 5A:
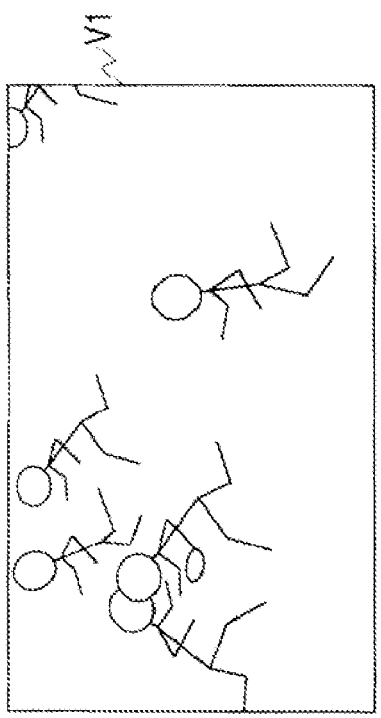
Figure 5B:
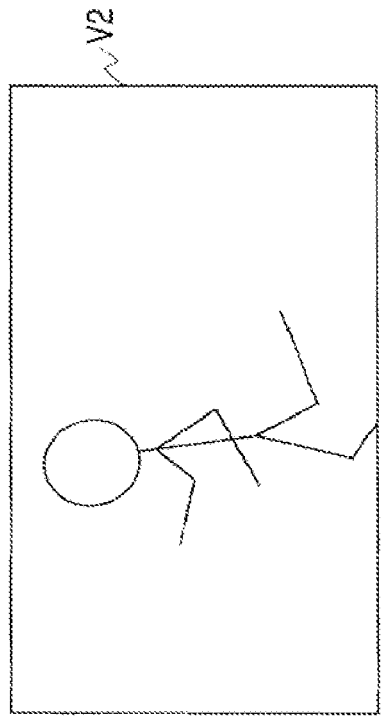

The image processing part 25 switches the operation controlled by the controller 24, selectively outputs the moving image data SV1 and SV2, and as shown in FIG. 5A or 5B, it displays the video slightly zoomed out V1 or the zoomed-in video V2 on the full screen on the display part 26. In addition, as shown in FIG. 5C, when the video slightly zoomed out V1 is displayed on the full screen, it shows a frame W1 in the area for cutting out the zoomed-in video V2. Moreover, when the controller 24 instructs the display of a picture in a picture, as shown in FIG. 5D, the video slightly zoomed out V1 is displayed on a sub-screen in the state in which the zoomed-in video V2 is displayed on the full screen. In addition, in the display of a picture in a picture, the frame frequency of the video slightly zoomed out V1 from the moving image data SV1 is increased by a scheme of pre-interpolation, and is set so as to match with the frame frequency of the zoomed-in video V2 from the moving image data SV2, whereby video V1 and V2 is displayed.

A remote commander (remote controller) 27 is a remote control device of the user terminal unit 3, which outputs remote control signals in infrared rays or radio waves.

The controller 24 is a control unit that controls the operation of the user terminal unit 3 in response to the operation of the remote commander 27 by executing a program recorded on a memory, not shown. In addition, in the embodiment, although the program is installed in the user terminal unit 3 in advance and offered, instead of this, the program may be offered by recording it on a recording medium such as an optical disk, a magnetic disk, and a memory card, and the program may be offered by downloading it via network such as the Internet. In addition, the decoders 22 and 23, and the image processing part 25 may be configured of a functional block of a processor unit configuring the controller 27.

Figure 6:
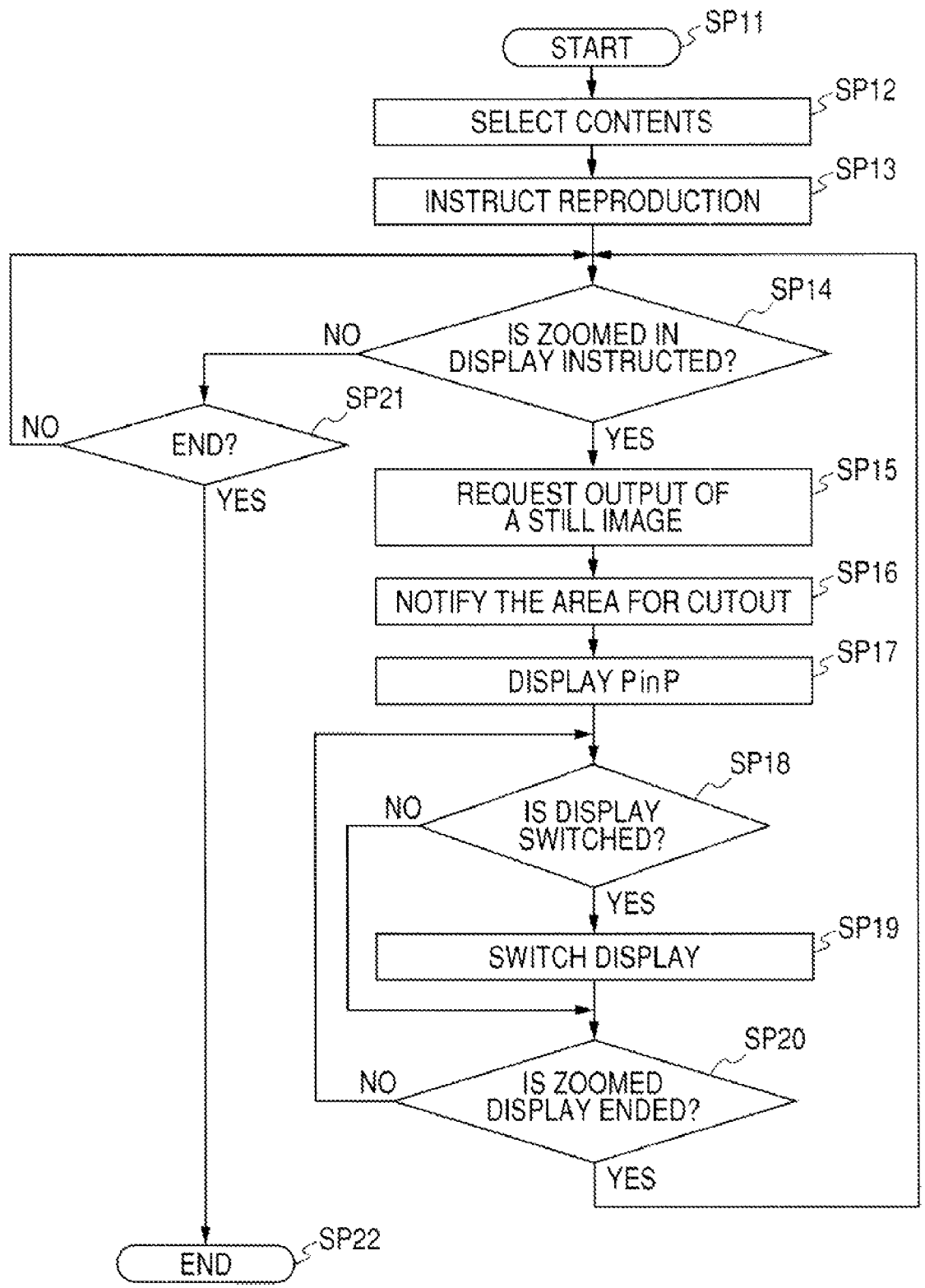
FIG. 6 shows a flow chart depicting the process steps of the user terminal unit shown in FIG. 4.

FIG. 6 shows a flow chart depicting the process steps of the controller 24. When a user instructs reproducing video contents by operating the remote commander 27, the controller 24 goes from Step SP11 to Step SP12, and it requests the host unit 2 to supply the list of the video contents. In addition, the controller displays the list of the video contents supplied from the host unit 2 by the request on the display part 26, and accepts the selection of video contents by the user.

Subsequently, the controller 24 goes to Step SP13, it requests the host unit 2 to reproduce the video contents selected by the user, and displays the video contents of encoded data DV1 outputted from, the host unit 3 on the display part 26. Thus, the controller 24 starts providing the video contents.

Subsequently, the controller 24 goes to Step SP14, and it determines whether the user operates the remote commander 27 to instruct showing zoomed-in video. Here, when it is negative, the controller 24 goes from Step SP14 to Step SP21, and determines whether the user operates the remote commander 27 to instruct finishing the reproduction of the video contents. Here, when it is negative, the controller 24 returns from Step SP21 to Step SP14, whereas when it is positive, the controller instructs the host unit 2 to finish reproducing the video contents, and goes from Step SP21 to Step SP22 to end the process steps.

In contrast to this, when it is positive in Step SP14, the controller 24 goes from Step SP14 to Step SP15. Here, the controller 24 requests the host unit 2 to output a still image, and displays the still image by switching the operation in the host unit 2. In addition, it displays a cursor on the still image.

In addition, in the subsequent Step SP16, it moves the position of the cursor displayed on the still image in response to the operation of the remote commander 27, and accepts the setting of the partial area to reproduce zoomed-in video. The controller 24 notifies the coordinate value inputted by accepting the setting to the host unit 2, and notifies the coordinates of the partial area to reproduce zoomed-in video to the host unit 2.

Subsequently, the controller 24 goes to Step SP17, it instructs the decoder 23 to activate the operation, whereby the encoded data DV1 and DV2 sent from the host unit 2 is set to be decoded in the decoders 22 and 23, respectively. In addition, it instructs the image processing part 25 to display a picture in a picture. In this case, as shown in FIG. 5D, the zoomed-in video V2 is displayed on the full screen, and the video slightly zoomed out V1 is displayed on the sub-screen at the left corner.

Subsequently, the controller 24 goes to Step SP18, and determines whether the user operates the remote commander 27 to switch display. Here, when it is positive, it goes from Step SP18 to Step SP19, switches the settings of the image processing part 25 to change the display of the display part 26, and then goes to Step SP20. In addition, here, the switching of the display by the display part 26 is the process of repeatedly switching the display in turn in response to the operation by the user, for example, on the full screen display of the zoomed-in video shown in FIG. 5B, the full screen display of the video slightly zoomed out shown in FIG. 5C, and the picture in a picture display shown in FIG. 5D.

In contrast to this, when it is negative in Step SP18, the controller 24 directly goes from Step SP18 to Step SP20. In Step SP20, the controller 24 determines whether the user instructs finishing the display of the zoomed-in video. Here, when it is positive, it instructs the host unit 2 to stop the output of the zoomed-in video, and then returns to Step SP14. In contrast to this, when it is negative in Step SP20, the controller returns from Step SP20 to Step SP18.

Figure 7:
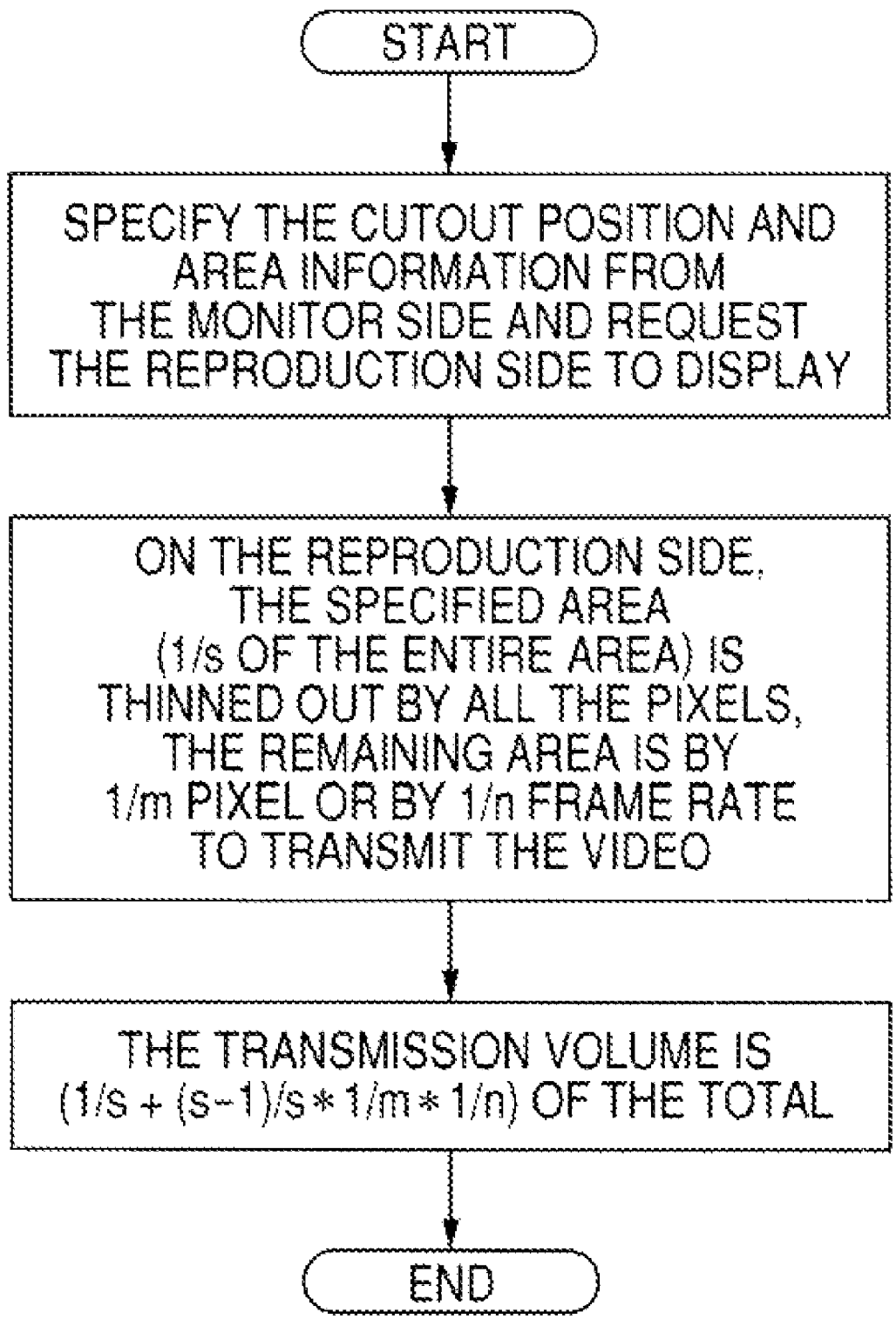
FIG. 7 shows a flow chart depicting the process steps of moving image data in the video content providing system according to Embodiment 1 of an embodiment of the invention.

As described above, in the video content providing system 1, as shown in FIG. 7, information that specifies the partial area to generate zoomed-in video is notified from the user terminal unit 3 on the monitor side to the host unit 3. For the partial area, the moving image data SV2 is sent in all the pixels and all the frames of the moving image data DVH, and for the other portions, the pixels and the frames are thinned out to send the moving image data SV1. In addition, in the embodiment, the moving image data SV1 to send the video slightly zoomed out is configured to send video for the partial area to generate zoomed-in video as well. However, for example, this scheme may be performed in which encoded data for the partial area is not sent by the settings of control codes in the encoder 13 to further reduce the data volume to send. In addition, in this case, it is necessary to use the moving image data SV2 on the image processing part 25 to interpolate the image data of the partial area.

As described above, when the area of 1/s of video of the moving image data SVH is partially cut out and is sent by the moving image data SV2, suppose the pixel thinning rate and the frame thinning rate are set to m and n, respectively, the transmission volume can be reduced to $(1/S+((S-1)/S)\times(1/n)\times(1/m))$ in total more than the case of directly sending the moving image data SVH. Here, more specifically, the transmission volume is $19/64$, where s=4, n=4, and m=4, and thus the transmission volume can be reduced to about 1/3.

2. Operation of the Embodiment

In the configuration above, in the video content providing system 1 (FIGS. 1 and 4), the user terminal unit 3 makes a request for reproducing the moving image data SVH and the audio signal of the video contents in the recording/reproducing device 11 of the host unit 2, and the moving image data SVH and the audio signal are sent to the user terminal unit 3, whereby the video contents desired by the user can be viewed on the user terminal unit 3 among a large volume of video contents stored in the host unit 2.

Here, the video contents thus provided from the user terminal unit 3 are sometimes the video contents that a sport relay broadcasting program is recorded, for example. In this case, a user follows a favorite player, for example, and sometimes desires to watch the favorite player zoomed in. In addition, a user sometimes follows and watches a bail zoomed in.

Then, in the video content providing system 1, when a user operates the remote commander 27 and instructs showing zoomed-in video in the user terminal unit 3, the video contents in moving images are displayed in a still image, and the area is specified in the still image to accept the area to zoom in. In addition, the area to zoom in is notified to the host unit 2. In the host unit 2, the moving image data SV2 of the specified area is cut out of the moving image data SVH of the video contents to be reproduced in the recording/reproducing device 11, and the moving image data SV2 is sent to the user terminal unit 3 together with the moving image data SV1. Thus, in the video content providing system 1, the moving image data for display is switched in the user terminal unit 3, whereby the zoomed-in video of the desired portion can be displayed on the full screen, or the entire video can be displayed on the full screen, or they can be displayed by a picture in a picture, leading to much more improved convenience for use than the conventional schemes do.

However, when the moving image data SV2 in the specified area is simply cut out of the moving image data SVH of the video contents to be reproduced in the recording/reproducing device 11, the data volume to send becomes enormous. Particularly, in order to prevent out-of-focus moving images and jerkiness from occurring in the moving image data SV2 to be cut out and generated, it is necessary to generate the original moving image data SVH in really high resolution, and to generate it at a high frame rate. Even though the original moving image data DVH is sent, the data volume to send becomes enormous.

For one of schemes of solving the problem, it can be considered that the moving image data SV2 is cut out on the user terminal unit 3 side, but in this case, in order to prevent out-of-focus moving images and jerkiness from occurring in the cut out video, it is necessary to generate the original moving image data SVH in really high resolution, and to generate it at a high frame rate. Also in this case, the data volume to send becomes enormous.

Then, in this embodiment, the video contents are recorded in the moving image data SVH of high resolution at a high frame rate so that out-of-focus moving images and jerkiness are prevented from occurring in the moving image data SV2 to be cut out and generated. In addition, for the moving image data SVH of a high frame rate, the pixels and the frames are thinned out to generate the moving image data SV1, and the moving image data SV1 is sent to the user terminal unit 3.

Thus, in the video content providing system 1, out-of-focus moving images and jerkiness can be prevented while an increase in the data volume to send is being avoided, and the video slightly zoomed out and zoomed-in video can be selectively provided to a user.

In other words, in the host unit 3, the subject included in the partial area specified by the user is detected, and the tracking target for zoomed-in video is detected. In addition, the partial area to generate zoomed-in video is moved so that the target for tracking is tracked, whereby the zoomed-in video such as a player desired by the user can be displayed in the user terminal unit 3. In this embodiment, the detection and tracking of the target for tracking are performed with the use of the video signal SV1 reduced in the resolution and the frame rate, whereby the configuration of providing the zoomed-in video and the video slightly zoomed out to the user is effectively used, and a desired subject is tracked by a simple process to display zoomed-in video.

In addition, when it is difficult to track the target, the size of the partial area to generate zoomed-in video is scaled up. In this case, although it is difficult to move the picture frame of zoomed-in video so as to track the desired subject, the desired subject can be roughly captured as zoomed-in video. In addition, even though the desired subject is not captured, agreeable video can be displayed. In other words, for example, in the cases in which a ball is followed by a television camera in a baseball game, and a ball is followed by a television camera in an American football game, it is sometimes difficult for even a fine camera person to follow the motion of the ball. In this case, when a camera person does not follow the bail, he/she temporarily zooms out, and again takes the target for tracking in the picture frame to zoom in the target for tracking. Therefore, in the case in which it is difficult to follow the target, the size of the partial area to generate zoomed-in video is scaled up, and then the operations of the camera person like this can be reproduced to display agreeable zoomed-in video.

3. Advantages of the Embodiment

According to the configuration above, the moving image data of high resolution at a high frame rate is partially cut out to generate the zoomed-in moving image data as well as the resolution and the frame of the remaining portion are thinned out to generate the moving image data slightly zoomed out, and the zoomed-in moving image data and the moving image data slightly zoomed out are sent, whereby out-of-focus moving images and jerkiness can be prevented while an increase in the data volume to send is being avoided, and the video slightly zoomed out and zoomed-in video can be selectively provided to a user.

In addition, the motion or the subject included in the partial area to generate the zoomed-in moving image data is tracked, and the partial area is moved as it follows the motion of the subject, whereby zoomed-in video can be displayed so as to track the desired subject.

In addition, the video slightly zoomed out is displayed on the user terminal unit 3 on the display device side, and the display device accepts the setting of the partial area to generate zoomed-in video, whereby the zoomed-in video of the subject desired by a user can be displayed.

In addition, more specifically, since the moving image data of the video contents that is the original of zoomed-in video is the video signal of a frame frequency of 120 Hz or greater, it is ensured that out-of-focus moving images and jerkiness can be prevented.

Embodiment 2

Figure 8:
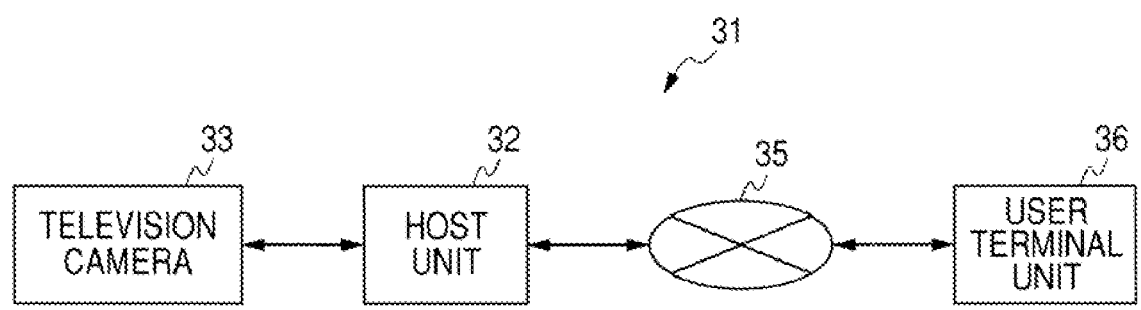
FIG. 8 shows a block diagram depicting a video content providing system according to Embodiment 2 of an embodiment of the invention.

FIG. 8 snows a block diagram depicting a video content providing system according to Embodiment 2 of the invention. In this video content providing system 31, a television camera 33 shoots the moving image data DVH of high resolution at a high frame rate, and the video contents of the moving image data DVH are provided to a user terminal unit 36 over a communication network 35. In addition, here, for the communication network 35, such networks are adapted including the Internet and a broadcast network that can make interactive data communications with the reception side.

Here, as similar to the host unit 2 according to Embodiment 1, the host unit 32 generates zoomed-in moving image data from moving image data SVH taken by the television camera 33 according to a request from the user terminal unit 36, and sends the data to the user terminal unit 36 together with the moving image data slightly zoomed out. Here, in this embodiment, since the moving image data SVH of the television camera 33 obtained in real time is the original to generate the zoomed-in moving image data, the host unit 32 analyzes the moving image data slightly zoomed out all the time, and tracks the motions of individual subjects in the moving image data slightly zoomed out. In addition, based on the results of tracking the motions, the host unit records and holds position information of the individual subjects together with the time code of the moving image data slightly zoomed out.

In addition, the user terminal unit 36 displays video of the moving image data slightly zoomed out, and when the user instructs showing zoomed-in video, it displays the video slightly zoomed out having been displayed in a still image, and accepts the selection of a target for tracking in zoomed-in video on the still image. The user terminal unit 36 notifies the time code of the video displayed on the still image and the coordinate value of the target subject for tracking to the host unit 32.

The host unit 32 searches the position information of the individual subjects recorded and held with the notified time code and the coordinate value, and detects the coordinates of the target for tracking in the current frame from the searched result. In addition, it in turn computes the partial area to generate zoomed-in video from the detected coordinates, selects the moving image data DVH based on the computed result, and outputs the zoomed-in moving image data. The video content providing system is similarly configured as the video content-providing system 1 according to Embodiment 1 except that the scheme of setting the partial area to cut out the zoomed-in video is different.

According to the embodiment, even though the video contents are made of real time moving image data, the same advantages as those of Embodiment 1 can be exerted.

Embodiment 3

In addition, in the embodiments above, the case is described in which a still image is displayed to accept settings of the tracking target in zoomed-in video. However, an embodiment of the invention is not limited thereto. Such a scheme may be performed in which when it is assured that the tracking target can be reliably inputted in practice, the settings of the tracking target are accepted in the state in which moving images are displayed.

In addition, in the embodiments above, the case is described in which the moving image data slightly zoomed out is sent including the partial area to cut out zoomed-in video, and the zoomed-in moving image data and the moving image data slightly zoomed out are encoded for transmission. However, an embodiment of the invention is not limited thereto. Such a scheme may be performed in which the moving image data slightly zoomed out is send only for the area except the partial area to cut out zoomed-in video, and the zoomed-in moving image data and the moving image data slightly zoomed out are collectively encoded.

In addition, in the embodiments above, the case is described in which pixels and frames are thinned out at certain thinning rates. However, an embodiment of the invention is not limited thereto. For example, the thinning rate may be dynamically varied in accordance with the usable transmission bands. In addition, in the case in which any one of zoomed-in video and video slightly zoomed out is selectively viewed on the user terminal unit side, for the video on the unviewed side, the output of moving image data may be stopped.

For example, an embodiment of the invention can be adapted in the case in which video contents such as a sport program are provided for a user.

It should be understood by those skilled in the art that various modifications, combinations, sub-combinations and alterations may occur depending on design requirements and other factors insofar as they are within the scope of the appended claims or the equivalents thereof.

What is claimed is:

1. A content providing method comprising the steps of:
   outputting moving image data of video contents;
   selecting moving image data in a partial area from the moving image data of the video contents, and outputting zoomed-in moving image data;
   thinning out frames and pixels of the moving image data of the video contents except at least the partial area, and outputting moving image data slightly zoomed out; and
   outputting the zoomed-in moving image data and the moving image data slightly zoomed out.

2. The content providing method according to claim 1, comprising the steps of:
   tracking the motion of a subject included in the partial area; and
   moving the partial area as it follows the motion of the subject based on the tracking result in the motion tracking step.

3. The content providing method according to claim 1, wherein in the data output step, the zoomed-in moving image data and the moving image data slightly zoomed out are outputted to a display device connected to a network over the network, and
   the partial area is an area specified by the display device.

4. The content providing method according to claim 1, wherein in the moving image data of the video contents is a video signal having a frame frequency of 120 Hz or greater.

5. A non-transitory computer-readable medium encoded with instructions that when executed cause a computer to perform a method comprising the steps of:
   outputting moving image data of video contents;
   selecting moving image data in a partial area from the moving image data of the video contents, and outputting zoomed-in moving image data;
   thinning out frames and pixels of the moving image data of the video contents except at least the partial area, and outputting moving image data slightly zoomed out; and
   outputting the zoomed-in moving image data and the moving image data slightly zoomed out.

6. A non-transitory computer-readable medium on which a program of a content providing method of providing video contents is recorded, the program of the content providing method comprising the steps of:
   outputting moving image data of video contents;
   selecting moving image data in a partial area from the moving image data of the video contents, and outputting zoomed-in moving image data;
   thinning out frames and pixels of the moving image data of the video contents except at least the partial area, and outputting moving image data slightly zoomed out;
   outputting the zoomed-in moving image data and the moving image data slightly zoomed out;
   tracking the motion of a subject included in the partial area; and
   moving the partial area as it follows the motion of the subject based on the tracking result in the motion tracking step.

7. A content providing apparatus comprising:
   a moving image data output part configured to output moving image data of video contents;
   a moving image data selecting part configured to select moving image data in a partial area from the moving image data of the video contents, and to output zoomed-in moving image data;
   a thinning part configured to thin out frames and pixels of the moving image data of the video contents except at least the partial area, and to output moving image data slightly zoomed out; and
   a data output part configured to output the zoomed-in moving image data and the moving image data slightly zoomed out.

8. A content providing apparatus which is connected to a network, and is configured to display moving image data outputted from a host unit,
   wherein the host unit includes:
      a moving image data output part configured to output moving image data of video contents;
      a moving image data selecting part configured to select moving image data in a partial area from the moving image data of the video contents, and to output zoomed-in moving image data;
      a thinning part configured to thin out frames and pixels of the moving image data of the video contents except at least the partial area, and to output moving image data slightly zoomed out; and
      a data output part configured to output the zoomed-in moving image data and the moving image data slightly zoomed out to the network, and
   the content providing apparatus includes:
      an input part configured to input the zoomed-in moving image data and the moving image data slightly zoomed out from the network; and
      a display part configured to selectively display the zoomed-in moving image data, the moving image data slightly zoomed out having been inputted in the input part.

* * * * *